United States Patent [19]

Safonnikov et al.

[11] 4,376,881

[45] Mar. 15, 1983

[54] METHOD OF ELECTROSLAG WELDING WITH A PLATE ELECTRODE

[76] Inventors: Anatoly N. Safonnikov, ulitsa Filatova, 1/22, kv. 78; Anatoly V. Antonov, Brovarskoi prospekt, 71, both of Kiev, U.S.S.R.

[21] Appl. No.: 227,047

[22] PCT Filed: May 29, 1979

[86] PCT No.: PCT/SU79/00032

§ 371 Date: Jan. 29, 1981

§ 102(e) Date: Dec. 23, 1980

[87] PCT Pub. No.: WO80/02664

PCT Pub. Date: Dec. 11, 1980

[51] Int. Cl.³ .............................................. B23K 25/00
[52] U.S. Cl. .................................................... 219/73.1
[58] Field of Search ....................................... 219/73.1

[56] References Cited

FOREIGN PATENT DOCUMENTS 149166 1/1961 U.S.S.R. .

OTHER PUBLICATIONS

Slovar-spravochnik po svarke, "Naukova Dumka" Publishers, Kiev, 1974, p. 187.

*Primary Examiner*—Elliot A. Goldberg
*Attorney, Agent, or Firm*—Lilling & Greenspan

[57] ABSTRACT

A method of electroslag welding and a flux used in the welding process are intended for welding heavy leads of electric installations, particularly busbars of electrolyzers used in non-ferrous metallurgy and chemical industry where intense magnetic fields act.

The method consists in the component parts to be welded being brought together to form a gap therebetween such that the area "B" of the gap relates to the area "A" of the horizontal cross-section of the welding electrode and to the area "C" of the projection of the surface of the welding bath to the horizontal plane as A:B:C=1:(1.2 to 1.5):(2.5 to 4.5).

The flux used in the welding process and comprising lithium fluoride and sodium fluoride further comprises potassium fluoride and calcium fluoride in the following ratio, % by weight:

| lithium fluoride | 60.0 to 90.0 |
| sodium fluoride | 5.0 to 20.0 |
| calcium fluoride | 1.0 to 5.0 |
| potassium fluoride | 4.0 to 15.0 |

6 Claims, 5 Drawing Figures

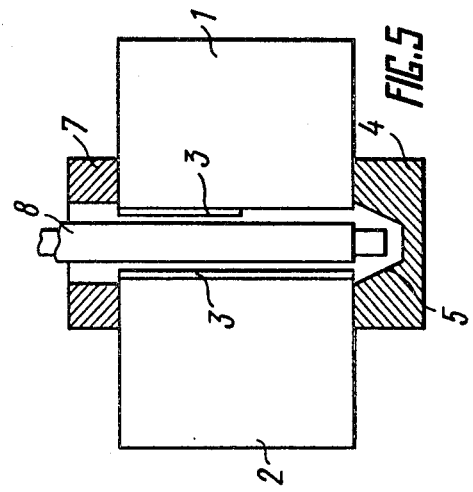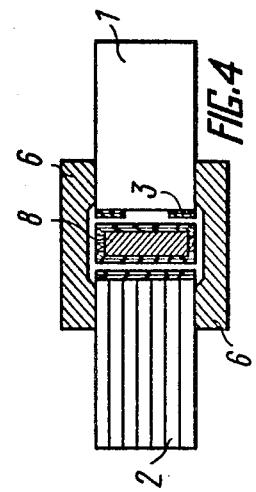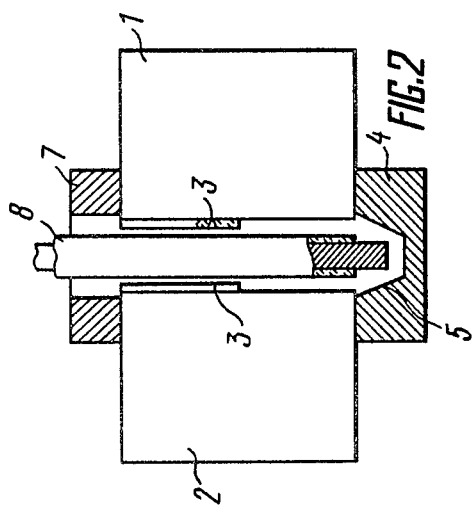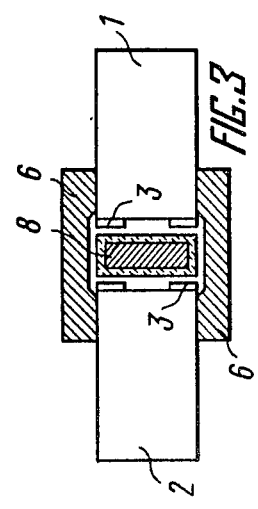

METHOD OF ELECTROSLAG WELDING WITH A PLATE ELECTRODE

FIELD OF THE INVENTION

The invention relates to the welding art and particularly to an electroslag welding method wherein a plate electrode is melted under conditions of deleterious effects of external magnetic fields with a high magnetic induction.

The electroslag welding with a plate electrode is to be understood as electroslag welding wherein used as electrodes are plates of large cross-section commensurable with the sizes of a gap between the component parts to be welded.

The deleterious effects of external magnetic fields upon the welding process manifest themselves, for example, in mounting heavy aluminium leads of electrolyzers used in non-ferrous metallurgy and chemical industry where external magnetic field act.

DESCRIPTION OF THE PRIOR ART

Up to now the problem of carrying out the welding process in external magnetic fields has not been adequately solved. Manual inert-gas-shielded submerged- and-tungsten welding used for assembly purposes fails to provide for a high-quality weld, particularly in mounting component parts, such as busbars for the electrolyzers having an appreciable thickness (100 to 200 ml). Normally, such component parts can be welded to advantage by means of a plate electrode. However, such a welding process carried out in intense external magnetic fields is unstable. This is due to the nature of the electroslag welding process wherein the metal is melted by the heat of the molten slag heated by an electric current passing therethrough (Slovar-spravochnik po svarke, "Naukova Dumka" Publishers, Kiev, 1974, p. 187). An external magnetic field acts upon the liquid slag and metal as a conductor with current, initiating the movement of the melt, which leads to unstability of the process, thus resulting in a sharp angular deflection of the surface of the welding bath.

It has been found that adequately welded joints can be obtained if the surface of the welding bath deflects from the horizontal plane by not more than 15°. If the angle of deflection of the surface of the welding bath exceeds 15°, there may occur one-sided incomplete fusion as well as splashing-out of the welding bath.

There is known in the art a method of electroslag welding with a plate electrode as described in USSR Inventor's Certificate No. 149,166 published in bulletin "Otkritia, izobreteni, promyshlennye obraztsy i tovarnyie znaki" No. 15, 1962. With this method on the component parts to be welded, which component parts are mounted with a gap between the edges thereof, there is assembled a moulding device comprising a bottom plate provided with a pocket, side molds and upper output straps which serve to maintain the slag bath at the final stage of the welding process. A portion of welding flux is charged into the pocket of the bottom plate, whereupon a plate electrode is introduced into the gap. The electrode is connected to one of the terminals of the welding current source, and the component parts to be welded and the bottom plate are connected to the other terminal. The welding process is initiated by touching the bottom of the pocket with the end of the electrode, thereby starting an electric arc which melts down the portion of the flux, thus forming a slag bath. The molten slag which is a conductor of electric current shunts the arc, thereby inducing the electroslag process which consists in the welding current passing through the molten slag, overheating the latter.

In the regions where the overheated slag contacts the electrode and the edges of the component parts, there takes place an intensive local heating of the component parts being welded and the electrode by the heat of the molten slag, and the material (metal) from which the component parts and the electrode are made melts down. The molten metal together with the molten slag disposed thereon forms a welding bath whose side portions form under the portions of the non-molten metal of the edges which have the form of shoulders whose width corresponds to the depth of the melting zone (fusion) of the edges. As the metal melts down in the gap, the level of the melt continuously rises, thereby providing for the heating and melting of new portions of the edges and the electrode. As a result, the shoulders and, consequently, the welding bath continuously moves upwardly.

Simultaneously therewith, in the lower portion of the welding bath the metal solidifies, thus forming a weld. The weld is being formed as the welding bath moves upwardly. The obtained weld is of higher quality due to the homogeneity of its metal and due to a good fusion of this metal with the metal of the component parts.

However, when this method is realized in an external magnetic field, there occurs, due to the above reasons, a sharp angular deflection of the surface of the welding bath (up to 90° with respect to the horizontal plane), accompanied by splashing-out of the welding bath from the gap. The above phenomena occur due to the relatively large open portion of the surface of the welding bath and therefore the magnetic field of the electrode, set up by the welding current, fails to neutralize the influence of the external magnetic field over the whole area of the open portion of the welding bath surface and prevent the melt from vertical movement at any peripheral portion of this area, which movement leads to an angular deflection of said open portion of the surface of the welding bath.

The term "open portion of the surface of the welding bath" is used herein to denote a portion of the surface of the melt, defined by the projection of a gap area to this surface.

The term "gap area" is used herein to denote an area defined by the edges of the component parts being welded, which area is equal to the product of the width of the gap multiplied by the width of the edges.

Because of the angular deflection of the open portion of the surface of the welding bath, the area of wetting of one of the edges being welded with the melt increases and, consequently, the welding current is redistributed over the edges. This is responsible for an incomplete fusion of one of the edges and more intensive fusion of the other one of the edges. As a result, the shoulder acquires a slightly sloping shape, which allows the melt previously confined by the shoulder to move under the action of the external magnetic field. This causes an angular deflection of the whole surface of the welding bath and the splashing of the melt out of the gap.

A sufficiently large gap conditioning the area of the open portion of the surface of the welding bath is necessary to prevent the development of undesirable turbulence in the welding bath, since a decrease in the gap impairs withdrawal of gas actively emanating as a result of heating of a slag forming flux and leads to saturation of the welding bath with a gaseous phase.

The term "slag forming flux" is used herein to denote a welding flux used for establishing a slag bath.

Such as active emanation of gas in the welding process is conditioned because the presently used fluxes readily boil and cause volatile compounds to emanate under the action of high welding temperatures. Among such fluxes is, for instance, a flux for welding aluminium, comprising in % by weight:

| lithium fluoride | 20 to 22 |
|---|---|
| sodium fluoride | 28 to 30 |
| potassium chloride | 15 to 20 |
| sodium chloride | 30 to 35 |

SUMMARY OF THE INVENTION

The object of the invention is to provide a method of electroslag welding with a plate electrode and a flux, used in the welding process, characterized by stability in external magnetic fields, achieved by optimizing the size of the open portion of the surface of the welding bath and by raising the boiling temperature of the flux.

The object set forth is attained by a method of electroslag welding with a plate electrode, includes positioning component parts to be welded with a gap in relation to one another, introducing a plate electrode into the gap, and melting the electrode and the edges of the component parts by the heat of electrically heated slag to establish an upwardly moving welding bath, the side portions of the surface of the welding bath being formed under movable shoulders of non-molten metal, the shoulders forming in the course of melting of the edges of the component parts. According to the invention, the component parts to be welded are brought together to form a gap therebetween such that the area "B" of the gap relates to the area "A" of the horizontal cross-section of the electrode and to the area "C" of the projection of the surface of the welding bath to the horizontal plane as A:B:C=1(1.2 to 1.5):(2.5 to 4.5) to maintain the angle of deflection within the range of 0° to 15° in relation to the horizontal plane with the aid of the movable shoulders limiting the vertical movement of the side portions of the surface of the welding bath, which side portions amounting to 40 to 75% of the area of the surface of the welding bath, and with the aid of the magnetic field of the electrode.

The above-described method of electroslag welding with a plate electrode provides for a stable welding process in external magnetic fields, this being possible due to the fact that with the above ratio of the areas A,B,C the sizes of the open portion of the surface of the welding bath are such that within their limits the magnetic field of the plate electrode neutralizes the effect of intense external magnetic fields and prevents the melt from splashing out. This being the case, the movable shoulders have sufficient sizes and an adequate shape to prevent the side portions of the surface of the welding bath from movement under the influence of external magnetic fields.

It is advisable that the movable shoulders be shaped by preliminarily applying an electrically insulating material to the edges of the component parts to be welded, the distruction temperature ($T_d$) of the electrically insulating material exceeding by 1.1 to 1.5 times the melting temperature ($T_m$) of the metal of the component parts being welded.

Shaping the movable shoulders to any definite form, such as substantially horizontally extending form, provides for holding by these shoulders of side portions of the surface of the welding bath against any angular deflection under the external magnetic fields with a great degree of reliability. The shoulders acquire a predetermined shape because the insulating material limits the area of wetting of a non-melted metal with a melt and, consequently, the intensity of heat action by means of preliminarily determined portions. If $T_d < 1.1\ T_m$, the electrically insulating material over the surface of the slag bath will fail, which makes it impossible to obtain the shoulders of a predetermined shape. If $T > 1.5\ T_m$, the electrically insulating material will stand the temperature until the metal bath reaches there, which is accompanied by appearance of slag inclusions in the weld.

It is most expedient that the electrically insulating material comprise a non-organic compound, namely a salt or a mixture of salts of Zi, Na, K, Mg, Ca, Zn, B, Al and/or oxides thereof and/or carbides thereof, since such compounds possess required thermal properties.

It is advisable that the electrically insulating material comprise an organic compound, such as a cellulose, veneer, organic resin, since such materials possess required thermal properties and, in addition, are easy to attach to the surface of the edges of the component parts to be welded.

The object set forth is also attained by a flux used in the welding method and comprising lithium fluoride and sodium fluoride, and according to the invention, further comprises potassium fluoride and calcium fluoride in the following ratio, % by weight:

| lithium fluoride | 60.0 to 90.0 |
|---|---|
| sodium fluoride | 5.0 to 20.0 |
| calcium fluoride | 1.0 to 5.0 |
| potassium fluoride | 4.0 to 15.0 |

The temperature of the above flux is higher than the working temperature of the electroslag welding, which sharply decreases gas emanation in the welding process and does not require a large gap between the edges of the component parts for gas withdrawal. This makes it possible to decrease the area of the open portion of the surface of the welding bath, which, as stated hereinabove, provides for the stability of the welding process in external magnetic fields.

It is advisable that the ratio between calcium fluoride and sodium fluoride be 1:5, the ratio of the components being the following, % by weight:

| lithium fluoride | 60.0 to 90.0 |
|---|---|
| sodium fluoride | 5.0 to 20.0 |
| calcium fluoride | 1.0 to 4.0 |
| potassium fluoride | 4.0 to 15.0 |

The above ratio between calcium fluoride and sodium fluoride ensures the maximum activity of the flux with respect to the metal being welded.

BRIEF DESCRIPTION OF THE DRAWINGS

FIG. 2 is an elevational view showing the moulding device and the component parts being welded, the edges of the component parts being half covered with an electrically insulating material;

FIG. 3 is a horizontal cross-section taken along line III—III of FIG. 1 showing the moulding device and the component parts being welded, the edges of the component parts being partly covered with an electrically insulating material;

FIG. 4 is a horizontal cross-section, taken along line IV—IV of FIG. 1, showing the moulding device with a monolith massive component part and with a packet of component parts; and FIG. 5 is an elevational view, showing the moulding device with component parts covered with an electrically insulating material as in welding of elements with different heat withdrawal.

DETAILED DESCRIPTION OF THE INVENTION

Figure 1:
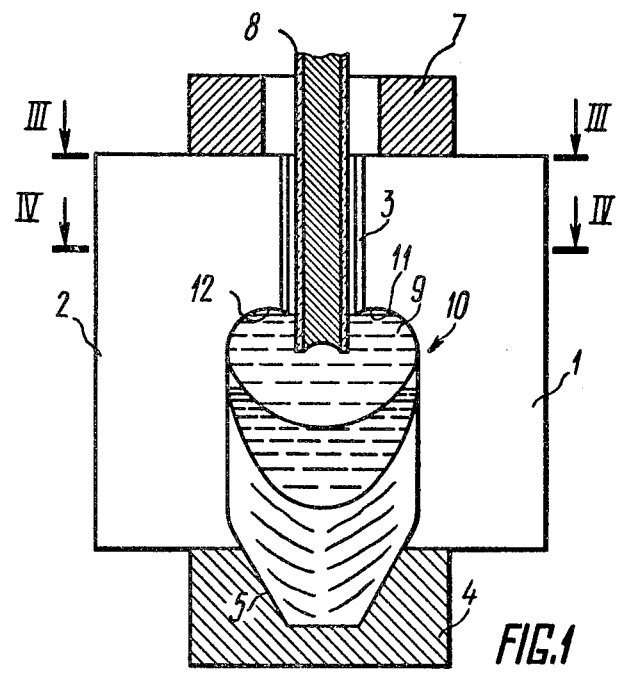
FIG. 1 is an elevational view, showing the component parts being welded and the moulding device for carrying out the method of electroslag welding according to the invention.

The method of the present invention is carried out in a magnetic field having a magnetic induction of up to $(40-45) \cdot 10^{-3}$ T.

The edges of component parts 1 and 2 to be welded (see FIG. 1), such as busbars, are covered with an electrically insulating material 3 whose destruction temperature $(T_d)$ exceeds the melting temperature $(T_m)$ of the component parts by 1.1 to 1.5 times. Not less than 50% of the area of the surface of the edges are covered with the electrically insulating material, and the component parts are positioned with a gap between the edges thereof.

A moulding device is assembled on the component parts 1 and 2. The moulding device consists of a bottom plate 4 having a pocket 5, side moulds 6, and upper output straps 7. The pocket 5 is charged with a portion of a slag forming flux of the following composition, % by weight:

| | |
|---|---|
| lithium fluoride | 60.0 to 90.0 |
| sodium fluoride | 5.0 to 20.0 |
| calcium fluoride | 1.0 to 5.0 |
| potassium fluoride | 4.0 to 15.0 |

Then a plate electrode 8 is introduced into the gap. The electrode is connected to one of the terminals of the welding current source (not shown), and the component parts 1 and 2 to be welded and the bottom plate 4 are connected to the other terminal of the same current source.

The component parts 1 and 2 are brought together to form a gap therebetween such that the area "B" of the gap relates to the area "A" of the horizontal cross-section of the electrode as A:B=1:(1.2–1.5).

The welding process is initiated by touching the bottom of the pocket 5 with the end of the electrode 8, thereby starting an electric arc which melts down the portion of the flux, thus forming a slag bath 9. The molten slag shunts the arc, thereby inducing the electroslag process. The welding current passes through the molten slag and overheats it. In the regions where the melt contacts the electrode and the edges of the component parts, there takes place an intensive fusion of the metal which flows into the pocket 5. The molten metal together with the slag layer (bath) 9 disposed thereon forms a welding bath 10, whose side portions are formed under the portions of the non-molten metal of the edges which have the form of shoulders 11 and 12 whose width corresponds to the depth of the fusion of the edges. The depth of the fusion is selected such that the area "A" of the horizontal cross-section of the electrode relates to an area "C" of the projection of the surface of the welding bath onto the horizontal surface as 1:(2.5–4.5). This is achieved by controlling the parameters of the welding process:

$$I_W \text{ and } U_{i.s.}$$

where $I_W$ is the value of the welding current; and
$U_{i.s.}$ the a voltage of the idle stroke of the welding current source.

Since the edges of the component parts 1 and 2 are covered with the electrically insulating material 3, the form of the movable shoulders 11 and 12 is substantially horizontal. This can be explained by the fact that the area of the intensive heat action of the slag bath 9 upon the metal of the component parts 1 and 2 is limited by the portions of immediate contact between the slag bath and the component parts.

The external magnetic field acts upon the welding bath 10 as upon a conductor with current, thereby initiating the movement of the bath. However, owing to the fact that the ratio between the areas A, B, C is such as described above, the sizes of the open portion of the surface of the welding bath 10 are such that within their limits the magnetic field of the plate electrode 8 neutralizes the effect of the external magnetic field and the movable shoulders 11 and 12 have sufficient sizes and an adequate shape to restrict the side portions of the surface of the welding bath from movement under the influence of external magnetic fields. This makes it possible to maintain the angle of deflection of the welding bath within the range of 0° to 15° in relation to the horizontal plane, thereby neutralizing the undesirable influence of the external magnetic field. The welding process becomes stable, which results in the welding bath moving upwardly in the gap as the metal of the edges and the electrode melts and the shoulders 11 and 12 move. Simultaneously therewith, the metal solidifies on the lower portion of the welding bath, thus forming a weld.

BEST MODE OF CARRYING OUT THE INVENTION

EXAMPLE 1

The method of the present invention was used for welding 140 mm thick aluminium busbars 1 and 2 in a magnetic field with a magnetic induction of $40 \cdot 10^{-3}$ T. The edges of the busbars to be welded were preliminary completely covered with an electrically insulating material 3 based on NaCl. The destruction temperature $(T_d)$ of the material 3 was 800° to 900° C., i.e. 1.2 to 1.3 times as high as the melting temperature $(T_m)$ of aluminium which is 660° C. An aluminium welding plate electrode 8 was 20 mm thick. To provide for stability of the process, a ratio of A:B:C=1:1.2:2.5 was employed. In accordance with the above ratio the width of the gap between the welding edges was calculated to be 24 mm and the depth of fusion of the welding edges to be 13 mm.

According to the calculation, the busbars 1 and 2 were brought together to form a gap 24 mm wide between the edges.

On the busbars 1 and 2 there was assembled a moulding device comprising a bottom plate 4 with a pocket 5, side moulds 6 and upper output straps 7.

Proceeding from that, the boiling temperature ($T_b$) of the slag forming flux should be higher than the working temperature of welding aluminium busbars ($T_w = 1200°$–$1400°$ C.). The flux was selected with the following composition, % by weight:

|  |  |
|---|---|
| lithium fluoride | 60.0 |
| sodium fluoride | 20.0 |
| calcium fluoride | 5.0 |
| potassium fluoride | 15.0 |

The boiling temperature ($T_b$) of the slag forming flux was 1500° C.

A portion of the slag forming flux was charged into the pocket 5. Then the plate electrode 8 was introduced into the gap, thus starting the electroslag process. To provide for the predetermined depth of fusion, the welding process was carried out under the following conditions:

$I_w = 7.0$ kA $U_{i.s.} = 44$ V.

The shoulders 11 and 12 formed in the course of the welding process were substantially horizontal. The angle of deflection of the surface of the welding bath was not more than 15°.

As a result of the welding process, a high-quality 50 mm thick weld was obtained.

EXAMPLE 2

The method of the present invention was used for welding 140 mm thick ingots from an alloy based on aluminium and containing 5.8% of magnesium in a magnetic field with a magnetic induction of $40 \cdot 10^{-3}$ T.

The melting temperature of the ($T_m$) was 654° C. Used as an electrically insulating material for covering the edges of the component parts was $Na_3AlF_6$. The destruction temperature ($T_d$) of the material was 1000° C.

| Thickness of the plate electrode | 20 mm |
|---|---|
| Ratio of the areas A:B:C | 1:2.3:3.5 |
| Width of the gap | 26 mm |
| Depth of the fusion of the edges | 22 mm |
| Welding conditions: |  |
| $I_w$ | 9.5 kA |
| $U_{i.s.}$ | 42 V |
| Working temperature ($T_w$) | 1200 to 1400° C. |

The flux was of the following composition, % by weight:

|  |  |
|---|---|
| lithium fluoride | 90.0 |
| sodium fluoride | 5.0 |
| calcium fluoride | 1.0 |
| potassium fluoride | 4.0 |

The boiling temperature ($T_b$) of the flux was 1510° C.

The assembly of the moulding device and the initiation of the electroslag process was carried out in accordance with Example 1. The angle of deflection of the surface of the welding bath was not more than 15° with respect to the horizontal plane. There was obtained a high-quality 70 mm thick weld.

EXAMPLE 3

The method of the present invention was used for welding forged pieces in a magnetic field.

The value of the magnetic induction was $40 \cdot 10^{-3}$ T.

The forged pieces and the electrode were made from a material based on iron containing in %: C, 0.10; Si, 0.54; Mn, 1.10; Cr, 17.75; Ni, 9.3; Ti, 0.51; Fe, up to 100.

Melting temperature ($T_m$) was 1385° C.

The ingots were 200 mm thick.

Used as the coating material was a mixture of $MgSO_4$ and $Al_2O_3$ taken in the ratio of 1:1.

Destruction temperature ($T_d$) was 1530° C.

The coating was applied to 50% of the area of each edge in the upper portion thereof (FIG. 2). This makes the welding process more intensive in its initial stage, while preserving the substantially horizontal form of the shoulder.

| Thickness of the plate electrode | 12 mm |
|---|---|
| Ratio of the areas A:B:C | 1:1.5:4.5 |
| Width of the gap | 18 mm |
| Depth of fusion of the edges | 18 mm |
| Welding conditions: |  |
| $I_w$ | 6 kA |
| $U_{i.s.}$ | 38 v |
| Working temperature ($T_w$) | 1540° C. |

The selected flux was of the following composition, % by weight:

|  |  |
|---|---|
| lithium fluoride | 70.0 |
| sodium fluoride | 20.0 |
| calcium fluoride | 4.0 |
| potassium fluoride | 6.0 |

The boiling temperature ($T_b$) of the flux was 1520° C.

The assembly of the moulding device and the initiation of the electroslag process was carried out in accordance with Example 1. The angle of deflection of the surface of the welding bath was not more than 15° with respect to the horizontal plane. There was produced a high-quality 54 mm thick weld.

EXAMPLE 4

The method of the present invention was used for welding forged pieces in a magnetic field.

The value of the magnetic induction was $40 \cdot 10^{-3}$ T.

The forged pieces and the electrode were made from an alloy based on ferronickel and containing in %: 0.04 of C; 0.51 of Si; 0.27 of Mn; 19.60 of Cr; 27.80 of Ni; 4.78 of B; 2.90 of Mo; 1.05 of Nb; up to 100 of Fe.

Melting temperature ($T_m$) was 1320° C.

The ingots were 100 mm thick.

Used as the coating material was a mixture of $Na_2O$, $K_2O$, $Zi_2O$, CaO taken in the ratio of 1:1:1:1.

Destruction temperature ($T_d$) was 1440° C.

For economical purposes the coating was applied only to the borders of the edges to be welded (FIG. 3) so as to cover 50% of the area of the edges. This being the case, the shape of the movable shoulders was close to one horizontal one.

| | |
|---|---|
| Thickness of the plate electrode | 10 mm |
| Ratio of the areas A:B:C | 1:1.3:3.5 |
| Width of the gap | 13 mm |
| Depth of fusion of the edges | 11 mm |
| Welding conditions: | |
| $I_w$ | 2.0 kA |
| $U_{i.s.}$ | 36 v |
| Working temperature ($T_w$) | 1500° C. |

The flux was of the following composition, % by weight:

| | |
|---|---|
| lithium fluoride | 85.0 |
| sodium fluoride | 4.0 |
| calcium fluoride | 4.0 |
| potassium fluoride | 7.0 |

The boiling temperature ($T_b$) of the flux was 1515° C.

The assembly of the moulding device and the initiation of the electroslag process were carried out in accordance with Example 1. The angle of deflection of the surface of the welding bath was not more than 15° with respect to the horizontal plane. There was produced a high-quality 35 mm thick weld.

EXAMPLE 5

The method of the present invention was used for welding busbars in a magnetic field.

The value of the magnetic induction was $40 \cdot 10^{-3}$ T.

The forged pieces and the electrode were made from copper.

| | |
|---|---|
| Melting temperature ($T_m$) was 1080° C. | |
| The busbars were 100 mm thick. | |
| The coating material was based on NaF. | |
| Destruction temperature ($T_d$) was 1420° C. | |
| Thickness of the plate electrode | 20 mm |
| Ratio of the areas A:B:C | 1:1.5:4.5 |
| Width of the gap | 30 mm |
| Welding conditions: | |
| $I_w$ | 10 kA |
| $U_{i.s.}$ | 44 v |
| Working temperature ($T_w$) | 1450° C. |

The flux was of the following composition, % by weight:

| | |
|---|---|
| lithium fluoride | 90.0 |
| sodium fluoride | 5.0 |
| calcium fluoride | 1.0 |
| potassium fluoride | 4.0 |

The boiling temperature of the flux was 1505° C.

The assembly of the moulding device and the initiation of the electroslag process were carried out in accordance with Example 1. The angle of deflection of the surface of the welding bath was not more than 15° with respect to the horizontal plane. There was produced a high-quality 90 mm thick weld.

EXAMPLE 6

The method of the present invention was used for welding aluminium busbars in a magnetic field. The busbar 1 was made in the form of an ingot, whereas the busbar 2 in the form of a set of sheets (FIG. 4). The value of the magnetic induction was $40 \cdot 10^{-3}$ T.

The busbars were 140 mm thick.

Melting temperature was 660° C.

The coating material was a 2 mm thick vaneer sheet.

Destruction temperature ($T_d$) was 730° to 750° C.

The edge of the busbar 2 was covered completely, and the edge of the busbar 1 was covered to the middle thereof from above (FIG. 5). This is due to the fact that the values of heat withdrawal of the busbar 1 and the busbar 2 are different.

| | |
|---|---|
| Thickness of the plate electrode | 20 mm |
| Ratio of the areas A:B:C | 1:1.2:2.5 |
| Width of the gap | 24 mm |
| Depth of fusion of the edges | 13 mm |
| Welding conditions: | |
| $I_w$ | 7.0 kA |
| $U_{i.s.}$ | 44 v |
| Working temperature ($T_w$) | 1200° C. |

The flux was of the following composition, % by weight:

| | |
|---|---|
| lithium fluoride | 75.0 |
| sodium fluoride | 15.0 |
| calcium fluoride | 3.0 |
| potassium fluoride | 7.0 |

The boiling temperature ($T_b$) of the flux was 1500° C.

The assembly of the moulding device and the initiation of the electroslag process were carried out in accordance with Example 1. The angle of deflection of the surface of the welding bath from the horizontal plane did not exceed 15°. The welding process resulted in the production of a 50 mm thick high-quality weld.

EXAMPLE 7

The welding process was carried out in a magnetic field.

The value of the magnetic induction was $40 \cdot 10^{-3}$ T. The material of the forged pieces and the electrode was an alloy based on iron and comprising in %: 0.10 of C; 0.54 of Si; 1.10 of Mn; 17.75 of Cr; 9.3 of Ni; 0.51 of Ti; up to 100 of Fe.

Melting temperature ($T_m$) was 1385° C.

The forged pieces were 140 mm thick.

The coating material was colophony with a filler CaO.

| | |
|---|---|
| Destruction temperature ($T_d$) was 1530° C. | |
| Thickness of the plate electrode | 12 mm |
| Ratio of the areas A:B:C | 1:1.5:4.5 |
| Width of the gap | 18 mm |
| Depth of fusion of the edges | 18 mm |
| Welding conditions: | |
| $I_w$ | 6 kA |
| $U_{i.s.}$ | 38 v |
| Working temperature ($T_w$) | 1540° C. |

The flux was of the following composition, % by weight:

| | |
|---|---|
| lithium fluoride | 65.0 |
| sodium fluoride | 20.0 |
| calcium fluoride | 5.0 |
| potassium fluoride | 10.0 |

The boiling temperature of the flux was 1550° C.

The assembly of the moulding device and the initiation of the electroslag process were carried out in accordance with Example 1. The angle of deflection of the surface of the welding bath from the horizontal plane did not exceed 15°. The welding process resulted in the production of a 54 mm thick high-quality weld.

EXAMPLE 8

The method of the present invention was used for welding forged pieces in a magnetic field.

The value of the magnetic induction was $40 \cdot 10^{-3}$ T.

The forged pieces and electrode were made from an alloy based on aluminium and comprising 5.8% magnesium.

Melting temperature ($T_m$) was 654° C.

The ingots were 140 mm thick.

The coating material was a material based on cellulose.

| | |
|---|---|
| Destruction temperature ($T_d$) was 730° C. | |
| Thickness of the plate electrode | 20 mm |
| Ratio of the areas A:B:C | 1:1.3:3.5 |
| Width of the gap | 26 mm |
| Depth of fusion of the edges | 22 mm |
| Welding conditions: | |
| $I_w$ | 9.5 kA |
| $U_{i.s.}$ | 42 v |
| Working temperature ($T_w$) | 1100° C. |

The flux was of the following composition, % by weight:

| | |
|---|---|
| lithium fluoride | 75.0 |
| sodium fluoride | 15.0 |
| calcium fluoride | 3.0 |
| potassium fluoride | 7.0 |

The boiling temperature of the flux was 1490° C.

The assembly of the moulding device and the initiation of the electroslag process were carried out in accordance with Example 1. The angle of deflection of the surface of the welding bath from the horizontal plane did not exceed 15°. The welding process resulted in the production of a 70 mm thick high-quality weld.

EXAMPLE 9

The method of the present invention was used for welding forged pieces in a magnetic field.

The value of the magnetic induction of the field was $40 \cdot 10^{-3}$ T.

The forged pieces and electrode were made from an alloy based on ferronickel and containing in %: 0.04 of C; 0.51 of Si; 0.27 of Mn; 19.6 of Cr; 27.8 of Ni; 4.48 of B; 2.9 of Mo; 1.05 of Nb; up to 100 of Fe.

| | |
|---|---|
| Melting temperature ($T_m$) was 1320. | |
| The ingots were 100 mm thick. | |
| The coating material was getinax. | |
| Destruction temperature ($T_d$) was 1460° C. | |
| Thickness of the plate electrode | 10 mm |
| Ratio of the areas A:B:C | 1:1.3:3.5 |
| Width of the gap | 13 mm |
| Depth of fusion of the edges | 11 mm |
| Welding conditions: | |
| $I_w$ | 2.0 kA |
| $U_{i.s.}$ | 36 v |
| Working temperature ($T_w$) | 1500° C. |

The flux was of the following composition, % by weight:

| | |
|---|---|
| lithium fluoride | 75.0 |
| sodium fluoride | 15.0 |
| calcium fluoride | 3.0 |
| potassium fluoride | 7.0 |

The boiling temperature of the flux was 1510° C.

The assembly of the moulding device and the initiation of the electroslag process were carried out in accordance with Example 1. The angle of deflection of the surface of the welding bath from the horizontal plane did not exceed 15°. The welding process resulted in the production of a 35 mm thick high-quality weld.

EXAMPLE 10

The method of the present invention was used for welding busbars in a magnetic field.

The value of the magnetic induction of the field was $40 \cdot 10^{-3}$ T.

| | |
|---|---|
| The ingots and electrode were made from copper. | |
| Melting temperature ($T_m$) was 1080° C. | |
| The ingots were 100 mm thick. | |
| The coating material was textolite. | |
| Destruction temperature ($T_d$) was 1420° C. | |
| Thickness of the plate electrode | 20 mm |
| Ratio of the areas A:B:C | 1:1.5:4.5 |
| Width of the gap | 30 mm |
| Depth of fusion of the edges | 30 mm |
| Welding conditions: | |
| $I_w$ | 10 kA |
| $U_{i.s.}$ | 44 v |
| Working temperature ($T_w$) | 1450° C. |

The flux was of the following composition, % by weight:

| | |
|---|---|
| lithium fluoride | 80.0 |
| sodium fluoride | 10.0 |
| calcium fluoride | 2.0 |
| potassium fluoride | 8.0 |

The boiling temperature ($T_b$) of the flux was 1505° C.

The assembly of the moulding device and the initiation of the electroslag process were carried out in accordance with Example 1. The angle of deflection of the surface of the welding bath from the horizontal plane did not exceed 15°. The welding process resulted in the production of a 90 mm thick high-quality weld.

INDUSTRIAL APPLICABILITY

The above method of electroslag welding and a flux used in the welding process are intended for welding heavy leads of electric installations, in particular of electrolyzers used in non-ferrous metallurgy and chemical industry. The welding processes are carried out under installation conditions in the zones where intense magnetic fields act.

We claim:

1. A method of electroslag welding with a plate electrode, including the steps of positioning component parts to be welded with a gap between the component parts; introducing a plate electrode into the gap; and melting the electrode and the edges of the component parts by the heat of electrically heated slag to establish an upwardly moving welding bath, the side portions of the surface of the welding bath being formed under movable shoulders of non-molten metal, said shoulders forming during the course of melting of the edges of the component parts, wherein the improvement comprises the component parts to be welded being brought together to form a gap between the component parts such that the area "B" of the gap relates to the area "A" of the horizontal cross-section of the electrode and to the area "C" of the projection of the surface of the welding bath to the a horizontal plane as $A:B:C = 1:(1.2$ to $1.5):(2.5$ to $4.5)$ to maintain an angle of deflection of the welding bath within the range of 0° to 15° in relation to the horizontal plane with the the movable shoulders limiting the vertical movement of the side portions of the surface of the welding bath, which side portions amounting to 40 to 75% of the area of the surface of the welding bath, and with a magnetic field of the electrode.

2. A method as claimed in claim 1, wherein in that the movable shoulders are shaped by preliminary applying an electrically insulating material to the edges of the components parts to be welded, the destruction temperature of the electrically insulating material exceeding from 1.1 to 1.5 times the melting temperature of the metal of the component parts.

3. A method as claimed in claim 2, wherein in that the electrically insulating material applied to the edges of the component parts to be welded comprises a non-organic compound, namely a salt or a mixture of salts of zi, Na, K, Mg, Ca, Zn, B, Al and/or oxides thereof, or carbides thereof.

4. A method as claimed in claim 2, wherein in that there is applied to the edges of the component parts to be welded an or organic compound which is a cellulose, veneer, organic resin.

5. A method as claimed in claim 1, wherein a flux used in the welding comprises lithium fluoride, sodium fluoride, potassium fluoride and calcium fluoride in the following ratio, % by weight:

| | |
|---|---|
| lithium fluoride | 60.0 to 90.0 |
| sodium fluoride | 5.0 to 20.0 |
| calcium fluoride | 1.0 to 5.0 |
| potassium fluoride | 4.0 to 15.0. |

6. A method as claimed in claim 5, wherein the ratio between calcium fluoride and sodium fluoride is 1:5, and the ratio of the components being the following, % by weight:

| | |
|---|---|
| lithium fluoride | 60.0 to 90.0 |
| sodium fluoride | 5.0 to 20.0 |
| calcium fluoride | 1.0 to 4.0 |
| potassium fluoride | 4.0 to 15.0. |

* * * * *